US008732341B2

(12) United States Patent
Desai et al.

(10) Patent No.: US 8,732,341 B2
(45) Date of Patent: *May 20, 2014

(54) USB DEVICE COMMUNICATION APPARATUS, SYSTEMS, AND METHODS (71) Applicant: Micron Technology, Inc., Boise, ID (US)

(72) Inventors: Girish Desai, Santa Clara, CA (US); Senthil Chellamuthu, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/834,247

(22) Filed: Mar. 15, 2013

(65) Prior Publication Data

US 2013/0212303 A1  Aug. 15, 2013

Related U.S. Application Data (63) Continuation of application No. 13/616,858, filed on Sep. 14, 2012, now Pat. No. 8,402,173, which is a continuation of application No. 12/957,081, filed on Nov. 30, 2010, now Pat. No. 8,335,865, which is a continuation of application No. 11/765,287, filed on Jun. 19, 2007, now Pat. No. 7,853,725.

(51) Int. Cl.
*G06F 3/00* (2006.01)
*G06F 5/00* (2006.01)

(52) U.S. Cl.
USPC .................................. 710/5; 710/36

(58) Field of Classification Search
None
See application file for complete search history.

(56) References Cited

U.S. PATENT DOCUMENTS

| 6,484,219 | B1 | 11/2002 | Dunn et al. |
| 6,795,872 | B2 | 9/2004 | Page et al. |
| 7,127,678 | B2 | 10/2006 | Bhesania et al. |
| 7,853,725 | B2 | 12/2010 | Desai et al. |
| 8,335,865 | B2 | 12/2012 | Desai et al. |
| 8,402,173 | B2 | 3/2013 | Desai et al. |
| 2008/0320198 | A1 | 12/2008 | Desai et al. |
| 2011/0072163 | A1 | 3/2011 | Desai et al. |
| 2013/0013815 | A1 | 1/2013 | Desai et al. |

FOREIGN PATENT DOCUMENTS

| EP | 1626346 A1 | 2/2006 |
| WO | WO-2008156810 A1 | 12/2008 |

OTHER PUBLICATIONS

"Device Class Specification Adopters Agreement", USB Implementers Forum.
"Errata for "USB Revision 2.0 Apr. 27, 2000" as of May 28, 2002", http://www.usb.org, (2002), 1-7.
"Errata for USB Revision 2.0 Apr. 27, 2000 as of Dec. 7, 2000", http://www.usb.org, (Dec. 7, 2000), 1-31.
"Inter-Chip USB Supplement to the USB 2.0 Specification", USB Implementers Forum, Inc. (USB-IF), Revision 1.0, (Mar. 13, 2006), 1-48.

(Continued)

*Primary Examiner* — Zachary K Huson
(74) *Attorney, Agent, or Firm* — Schwegman, Lundberg & Woessner, P.A.

(57) ABSTRACT

Some embodiments include methods and apparatus to decode a functional request embedded in a portion of a standard device request, and execute the functional request by a universal serial bus (USB) device. The standard device request can include a Get_Descriptor request. Other embodiments are described.

20 Claims, 8 Drawing Sheets

(56) References Cited

OTHER PUBLICATIONS

"Interface Association Descriptors", Universal Serial Bus Specification, Revision 2.0, USB Engineering Change Notice, (No publication date listed).

"International Application Serial No. PCT/US2008/007649, International Search Report mailed Oct. 9, 2008", 3 pgs.

"International Application Serial No. PCT/US2008/007649, International Written Opinion mailed Oct. 9, 2008", 4 pgs.

"Memorex Mini TravelDrive U3", http://www.ememorex.com/product_detail.asp?T1=MEM+MINITDU3+256MB&SKW=M&., (2007).

"On-The-Go Supplement to the USB 2.0 Specification", USB Implementers Forum, Inc. (USB-IF), Revision 1.3, (Dec. 5, 2006), 1-45.

"Pull-up/Pull-Down Resistors", Universal Serial Bus Specification Revision 2.0, USB Engineering Change Notice, (No publication date listed), 1-5.

"Rounded Chamfer", USB 2.0 Specification, USB Engineering Change Notice, (No publication date listed), 1-3.

"Unicode UTF-16LE for String Descriptors", Universal Serial Bus Specification, Revision 2.0, (Feb. 21, 2005), 1-2.

"Universal Serial Bus Micro-USB Cables and Connectors Specification", USB Implementers Forum, Inc., Revision 1.01, (Apr. 4, 2007), 1-36.

"Universal Serial Bus Specification", USB Implementers Forum, Inc. (USB-IF), Revision 2.0, (Apr. 27, 2000), 1-650.

"Universal Serial Bus Specification Revision 2.0", Universal Serial Bus Specification, no Rev 2.0, (Apr. 27, 2000), pp. 1-622.

"USB 2.0 Specification Engineering Change Notice (ECN) #1: Mini-B connector", Universal Serial Bus Specification Revision 2.0, (Oct. 20, 2000), 1-45.

USB DEVICE COMMUNICATION APPARATUS, SYSTEMS, AND METHODS

PRIORITY APPLICATION

This application is a continuation of U.S. application Ser. No. 13/616,858, filed Sep. 14, 2012, which is a continuation of U.S. application Ser. No. 12/957,081, filed Nov. 30, 2010, now issued as U.S. Pat. No. 8,335,865, which is a continuation of U.S. application Ser. No. 11/765,287, filed Jun. 19, 2007, now issued as U.S. Pat. No. 7,853,725, all of which are incorporated herein by reference in their entirety.

TECHNICAL FIELD

Various embodiments described herein relate to apparatus, systems, and methods associated with Universal Serial Bus (USB) communications, including communicating with devices in a restricted host environment.

BACKGROUND

USB devices are utilized as part of a number of systems including but not limited to printers, monitors, keyboards, mice, memory devices such as flash memory devices or "thumb drives," cellular phones, digital cameras, digital recorders, and other peripherals. Computers are designed to utilize various operating systems such as Microsoft's Windows XP™ and Windows Vista™ and Apple's Mac OS X™.

USB devices generally operate using a standard protocol or interface, such as the interface set by the USB Implementers Forum, Inc. The USB Implementers Forum, Inc. is a non-profit corporation founded by a group of companies that developed a Universal Serial Bus specification. For more information regarding the USB specification, the reader is encouraged to consult the document "Universal Serial Bus Specification" Revision 2.0, published by the USB Implementers Forum in 2000, and later versions (hereinafter the "USB Specification").

USB devices may communicate with computers utilizing an operating system without the need to install additional drivers or software onto the computer provided the instructions or requests used by the USB device are supported by the drivers resident on the host. Administrators may wish to maintain control over a user's modifications to a computer. Thus, operating systems allow administrators to limit the ability of users to install or update drivers or modify the operation of the computer. The environment the user encounters in this case is often referred to as a restricted host environment.

DETAILED DESCRIPTION

Figure 1:
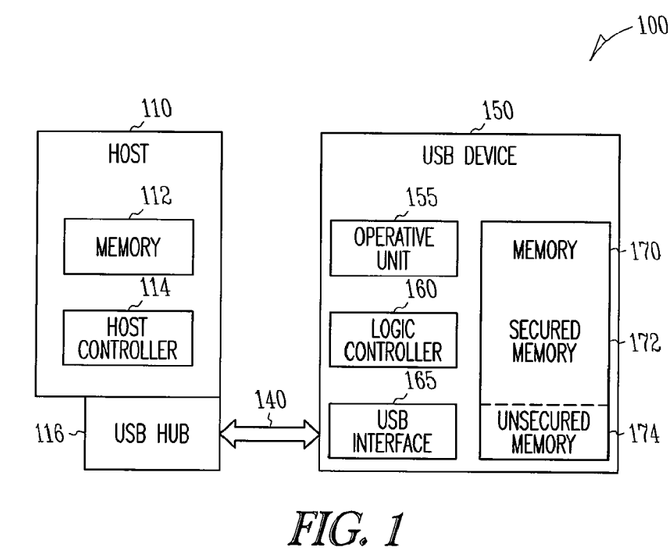
FIG. 1 shows a block diagram of a system according to an embodiment of the invention.

FIG. 1 shows a block diagram of a system 100 according to an embodiment of the invention. The system may comprise a host 110 and a USB device 150. The host 110 may comprise a memory 112, a host controller 114, and a USB hub 116. The host 110 may interact with the USB device 150 through the host controller 114 via a USB hub 116 and bus 140. The host 110 may store software, drivers and an operating system in memory 112. The memory 112 may comprise volatile and nonvolatile memory, including flash memory, and can be accessed by the host controller 114 to utilize the software, drivers and operating system.

The USB device 150 may comprise a USB bus interface 165 to receive control endpoint standard device requests with embedded functional sub-requests. The functional sub-requests can be embedded in a portion of the control endpoint standard device request. The USB device 150 may also comprise a logic controller 160 to implement the functional sub-request. The functional sub-request may comprise a buffer operation (e.g., buffer reset, buffer copy, and fetching the buffer structure); or a security operation (e.g., login/logout, enabling/disabling security, changing the password, reading/writing key data, and media recovery). In addition, functional requests may be specific functional requests to USB device 150, such as power off, power on, record, and others as specified by the USB device developer.

The USB bus interface 165 may operate to receive data in a second portion of the control endpoint standard device request. If the functional sub-request is a write request, for example, logic controller 160 may operate to receive the data and store the data in a location in the memory 170.

Memory 170 may be partitioned to include a secured memory 172 and an unsecured memory 174. The functional sub-request may be a security request, in which case the logic controller 160 may operate to lock the secured memory 172 of the USB device 150. The logic controller 160 may operate to unlock the secured memory 172 of the USB device 150 when the functional sub-request is a unlock request. In addition the logic controller 160 may operate to erase the memory 170 or a portion thereof, when the functional sub-request is an erase request.

The unsecured memory 174 may be used to store client software. The client software, in turn, may be transferred by a user to the host 110 and stored in the memory 112. The client software may be executed by the host controller 112 to encode a functional sub-request forming a first portion of a control endpoint standard device request. The client software may be executable code that may run in a restricted host environment. In a restricted host environment, the user may not be permitted to install drivers onto host 110. The inability to install drivers on a host 110 may limit the functionality of USB device 150. However, even when the host 110 is operating in a restricted host environment, the operating system may allow the installation of client software in memory 112 either from unsecured memory 174, the internet, or other media.

USB device 150 may also comprise an operative unit 155, such as printer hardware, a camera, or other hardware. The operative unit 155 may be controlled by logic controller 160 to perform an action, such as printing, taking a picture, and scanning a document.

The USB bus interface 165 may receive data in a second portion of a control endpoint standard device request, wherein the functional sub-request comprises a write request. The write request may cause the memory 170 to receive the data and to store the data in the memory 170. The USB device 150 may also have the logic controller 160 lock the USB device 150 when the functional sub-request comprises a lock request. The USB device 150 may also have logic controller 160 unlock the USB device 150 when the functional sub-request is a unlock request. The USB device 150 may also have the logic controller 160 erase the memory 170 when the functional sub-request comprises an erase request.

Figure 2:
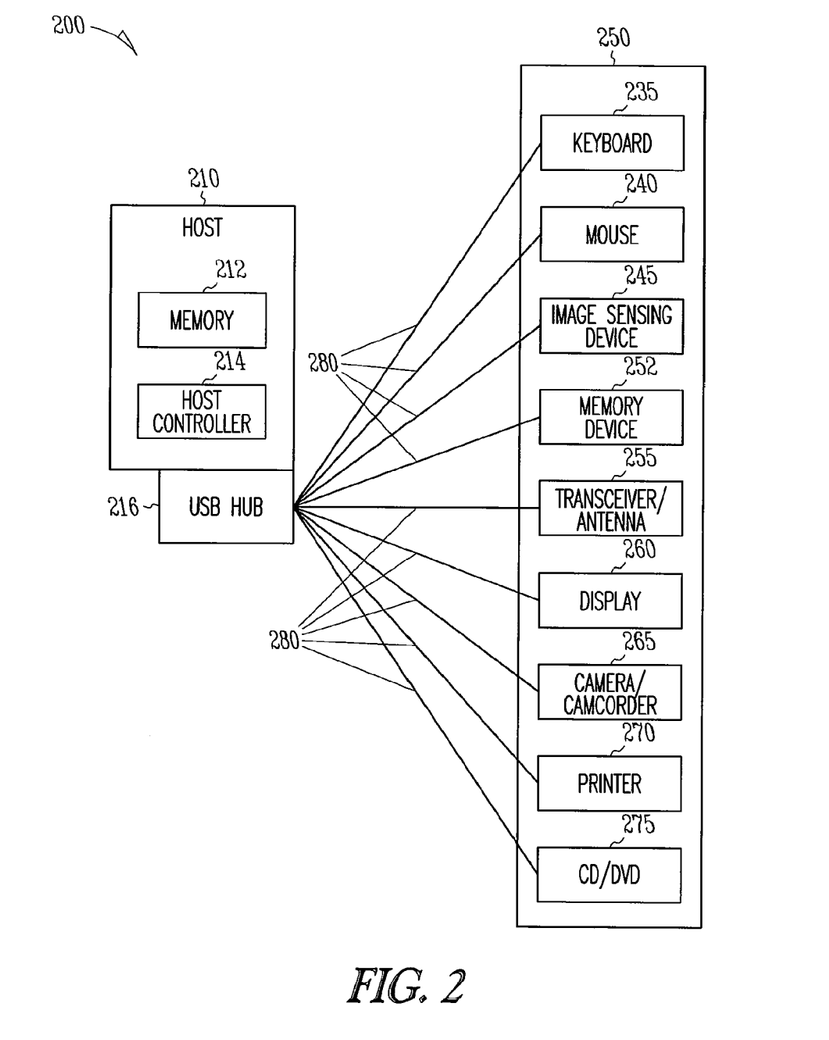
FIG. 2 shows a block diagram of a system according to an embodiment of the invention.

FIG. 2 shows a block diagram of a system 200 according to an embodiment of the invention. The system 200 comprises a host 210 and a USB device 250. Host 210 may comprise a memory 212, a host controller 214, and a USB hub 216. USB hub 216 may be attached via an electrical wire, bus or wirelessly via connection 280, to USB device 250. USB device 250 may comprise one or more of a keyboard 235, a mouse 240, an imaging sensor 245, a memory device 252, a transceiver/antenna 255, a display 260, a camcorder or camera 265, a printer 270, a compact disc (CD)/digital video disc (DVD) drive 275, or any number of other devices that may be attached to a host 210 via a USB connection 280 to a USB hub 216.

Figure 3:
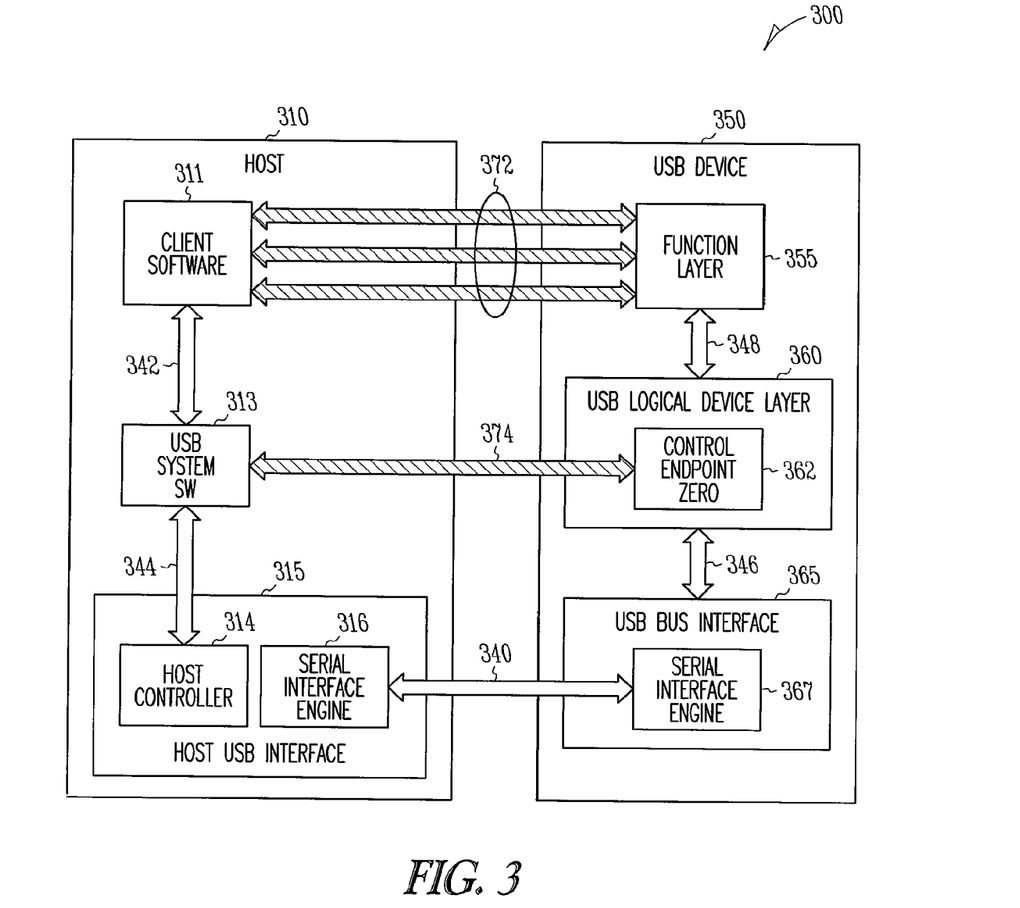
FIG. 3 shows a block diagram of communication flow according to an embodiment of the invention.

FIG. 3 shows a block diagram of communication flow according to an embodiment of the invention. The system 300 comprises a host 310 and a USB device 350. Host 310 may comprise client software 311, USB system software 313, and a Host USB interface 315. The Host USB interface 315 may comprise a Host Controller 314 and a Host Serial Interface Engine 316. USB device 350 may comprise a function layer 355, a USB logical device layer 360, and a USB bus interface 365. USB logical device layer 360 may comprise a control endpoint zero 362. USB bus interface 365 may comprise a USB serial interface engine 367.

Information flows for the system 300 includes representations of true data flows in bus 340, 342, 344, 346, and 348. Data flows illustrated in functional pipes 372 and message pipe or control pipe 374 (to be designated as control pipe 374 for the balance of this document) are abstract representations of data flows. While both functional pipes 372 and control pipe 374 are not hardwired pipes, and data between host 310 and USB device 350 actually flows through bus 340, for ease of understanding the operation of various embodiments, data flow through control pipe 374 will be characterized as device requests. The control pipe 374 normally comes into existence once a USB device 350 is powered on, in order to provide access to the USB device's 350 configuration, status, and control information.

Each USB device 350 may support one or more functional pipes 372 through which the host 310 may communicate with the USB device 350. USB devices, such as USB device 350 generally supports a specially designated control pipe 374 at control endpoint zero 362 to which the control pipe 374 may be attached. Associated with the control pipe 374 at control endpoint zero 362 may be the information used to describe the USB device 350. A control pipe 374, also known as a message pipe, is defined in the USB Specification as "A bi-directional pipe that transfers data using a request/data/status paradigm. The data has an imposed structure that allows requests to be reliably identified and communicated."

Data processed through control pipe 374 may have a set configuration and be limited to 8 bytes. Control pipe 374 is normally used to send and receive USB device requests. USB device requests are normally eight bytes in length and follow the format set in table 1.

TABLE 1

| Offset | Field | Size (Bytes) | Value |
|---|---|---|---|
| 0 | bmRequest Type | 1 | Request Type |
| 1 | bmRequest | 1 | Request |
| 2 | wValue | 2 | Value |
| 4 | wIndex | 2 | Index or Offset |
| 6 | wLength | 2 | Count |

There are currently eleven standard device request codes set out, and two codes that may be set in the future. The eleven codes are: Get_Status, Clear_Feature, Set_Feature, Set_Address, Get_Descriptor, Set_Descriptor, Get_Configuration, Set_Configuration, Get_Interface, Set_Interface, and Synch_Frame.

A Clear_Feature is used to clear or disable a specific feature of USB device 150, 250, 350. A Get_Interface request may be used to retrieve a selected alternate setting for a specified interface from the USB device 150, 250, 350. A Set_Interface request may be used to set a specified interface for the USB device 150, 250, 350. A Get_Status request may be used to retrieve the status of the USB device 150, 250, 350. Set_Address may be used to set the USB device 150, 250, 350 address for future USB device 150, 250, 350 access. Set_Configuration may be used to set the USB device configuration. Get_Configuration may cause the USB device 150, 250, 350 to provide the current configuration value for the USB device 150, 250, 350. Set_Descriptor may be used to update existing descriptors, or to add new descriptors to USB device 150, 250, 350. Set_Feature is a request that can be used to set or enable a specific feature of the USB device 150, 250, 350. Synch_Frame is a request used to set and then report an endpoint's synchronization frame. For further information regarding the specifics of the standard device request codes and their use the reader is encouraged to consult the USB Specification.

When a Get_Descriptor request is made, USB device 150, 250, 350 returns a specific descriptor to the host 110, 210, 310. The specific descriptor may include standard information such as vendor identification, device class, and power management capability. In addition, specific descriptors may include device, configuration, interface, and endpoint descriptions, as well as other configuration-related information about the device.

Get_Descriptor requests are formatted as shown in table 2 below:

TABLE 2

| bmRequest Type | bmRequest | wValue | wIndex | wLength | Data |
| --- | --- | --- | --- | --- | --- |
| 10000000B | Get_Descriptor | Descriptor Type and Descriptor Index | Zero or Language ID | Descriptor Length | Descriptor |

Get_Descriptor requests support a limited number of descriptor type and descriptor index requests in the wValue field portion of the request. Table 3 lists the descriptor types specified in the USB Specification.

TABLE 3

| Descriptor Types | Value |
| --- | --- |
| Device | 1 |
| Configuration | 2 |
| String | 3 |
| Interface | 4 |
| Endpoint | 5 |
| Device Qualifier | 6 |
| Other Speed Configuration | 7 |
| Interface Power | 8 |

Thus, only a limited number of descriptor codes are prescribed for use in the wValue field of a Get_Descriptor request. None of these comprise a functional request. However, by utilizing a value that is not prescribed, the wValue field can be used to encode a functional request. For example, if a user desires to reset a buffer, the executable file may have the host controller 114 of FIG. 1 send a Get_Descriptor request with wValue with a high byte of 0x03 and a low byte of 0x10, as shown in Table 4. Such a request is not recognized by the USB Specification.

TABLE 4

| bmRequest Type | bmRequest | wValue | | wIndex | | wLength | |
| --- | --- | --- | --- | --- | --- | --- | --- |
| 1 byte | 1 byte | 2 byte | | 2 byte | | 2 byte | |
| 10000000B | 00000110B | 0x03 | 0x10 | 0x00 | 0x00 | 0x00 | 0x00 |

Other requests not recognized by the USB Specification may also be made in this manner. For example, referring to FIG. 1, USB device 150 (e.g., a mass storage device). USB device 150 may be accessed by host 110 using mass storage protocols to read/write data from or to the USB device 150. In special cases, a USB device 150 may provide extra functions, such as locking the secured memory 172 of USB device 150 or unlocking the secured memory 172 of USB device 150.

Host 110 may operate in a restricted mode as set by the administrators or operations system of Host 110. If Host 110 is in a restricted mode, the host controller 114 may be unable to access vendor-specific requests without installing additional drivers in memory 112. The USB device 150 may have an executable file stored in the unsecured memory 174 partition of memory 170. By transferring the executable file to memory 112, host controller 114 may run the executable file.

Logic controller 160 may receive the Get_Descriptor request from host 110. Logic controller 160 may decode the Get_Descriptor request and a functional command encoded into wValue. Referring to FIG. 3, it can be seen that the USB system software 313 transmits the Get_Descriptor request to the control endpoint zero 362 via control pipe 374. USB logical device layer 360 may decode the Get_Descriptor command and determine that the wValue portion of the Get_Descriptor request is not a descriptor request but a functional request. USB logical device layer 360 may then execute the functional request encoded into wValue.

Figure 4:
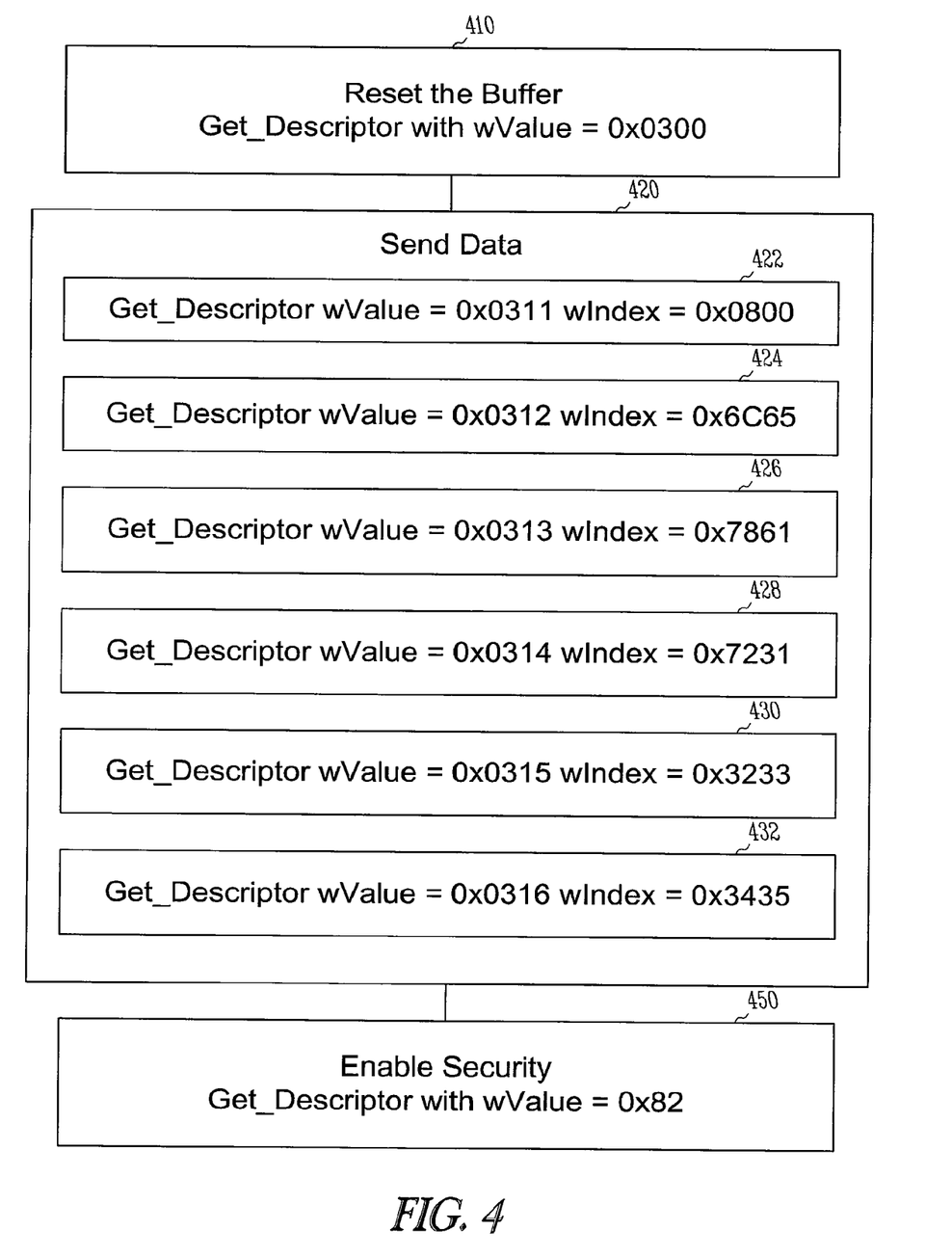
FIG. 4 shows a flow diagram of a method of enabling a security operation according to an embodiment of the invention.

FIG. 4 shows a flow diagram of a method of enabling a security operation according to an embodiment of the invention. FIG. 4 illustrates how a user operating an embodiment of the invention may enable the security function using a password "lexar12345".

Activity 410 may include decoding a reset buffer request from the first portion of a control endpoint standard device request, and resetting the buffer. For example, the first portion of the control endpoint standard device request may be the wValue portion of a Get_Descriptor request.

Activity 420, comprising several sub-activities, may involve writing the password to a specific location, such as in the memory 170 of USB device 150 of FIG. 1. To send the password to the USB device 150, 250, 350 the host 110, 210, 310 (see FIGS. 1, 2, 3) may encode data into a second portion of the control endpoint standard device request. The second portion of the control endpoint standard device request may comprise the wIndex portion of a Get_Descriptor request, for example.

The first portion of the Get_Descriptor request, wValue, may have a write request encoded with a memory location. To write the password, "lexar12345" into the memory 170 of USB device 150 of FIG. 1, host 110 may need to submit six separate Get_Descriptor requests, 422, 424, 426, 428, 430 and 432.

Activity 422 may comprise a Get_Descriptor request with a write request encoded into wValue for location 11 and wIndex may be encoded with data 0800. Activity 424 may comprise a Get_Descriptor request with a write request encoded into wValue for location 12 and wIndex may be encoded with data 6C65. Activity 426 may comprise a Get_Descriptor request with a write request encoded into wValue for location 13 and wIndex may be encoded with data 7861. Activity 428 may comprise a Get_Descriptor request with a write request encoded into wValue for location 14 and wIndex may be encoded with data 7231. Activity 430 may comprise a Get_Descriptor request with a write request encoded into wValue for location 15 and wIndex may be encoded with data 3233. Activity 432 may comprise a Get_Descriptor request with a write request encoded into wValue for location 16 and wIndex may be encoded with data 3435. When received by the USB device and decoded and executed the result may be that the USB device buffer has stored the data string "08 00 6C 65 78 61 72 31 32 33 34 35" corresponding to the password "lexar12345". The USB device now has the password "lexar12345" stored in it for future use. To enter additional data into the USB device, one would simply repeat the writing requests illustrated above until the desired amount of data was written to the buffer.

Activity 450 may include sending a Get_Descriptor command with wValue encoded with an enable security request.

The USB device may now have its security function enabled with a password of "lexar12345".

Figure 5:
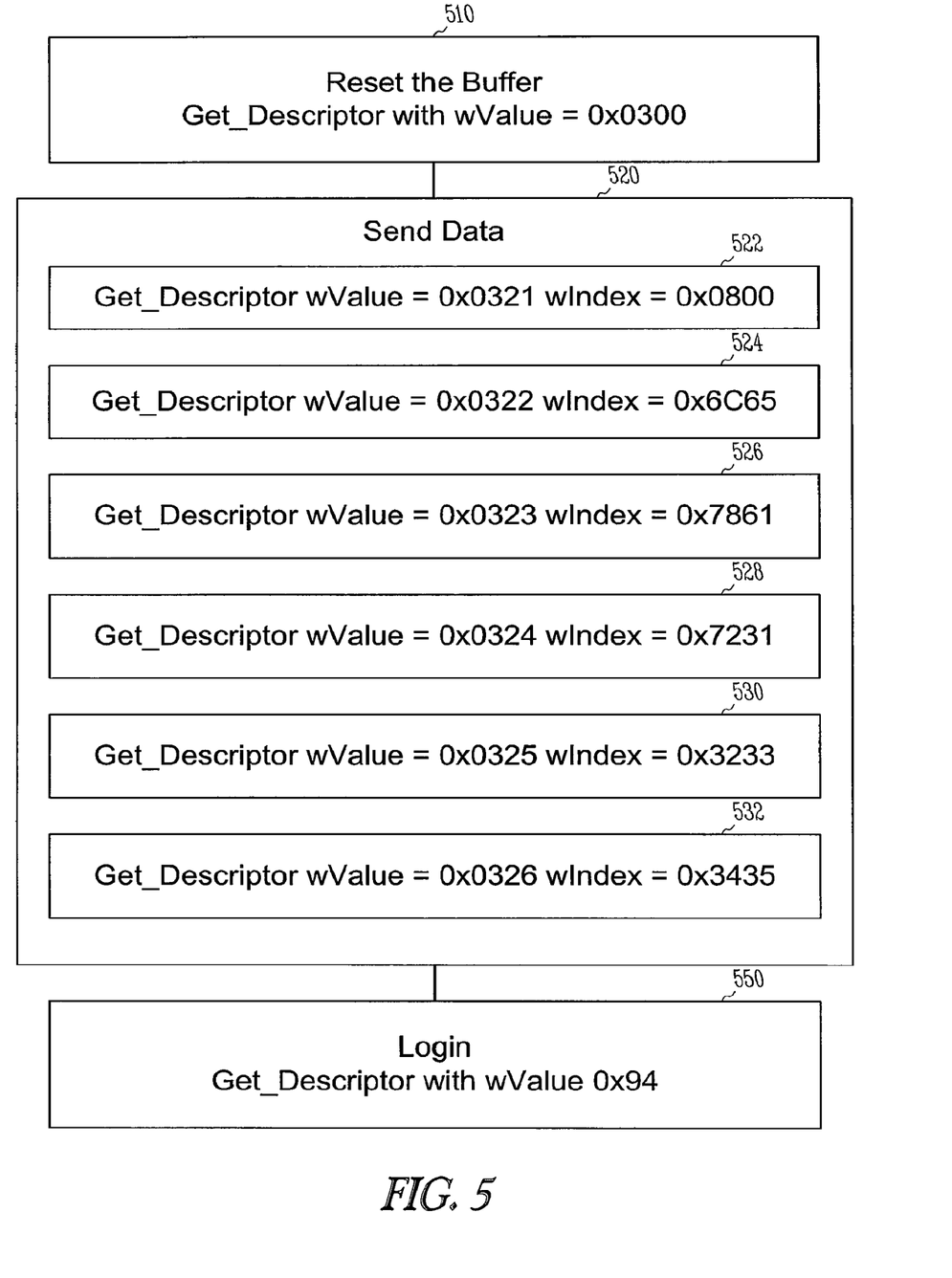
FIG. 5 shows a flow diagram of a method of logging in to a locked USB device according to an embodiment of the invention.

FIG. 5 shows a flow diagram of a method of logging in to a locked USB device according to an embodiment of the invention. Once a password is set in USB device 150, 250, 350, activity 510 may involve resetting the buffer. Activity 520 may involve sending the password, comprising several sub-activities 522, 524, 526, 528, 530, and 532.

Activity 522 may comprise a Get_Descriptor request with a write request encoded into wValue for location 21 and wIndex may be encoded with data 0800. Activity 524 may comprise a Get_Descriptor request with a write request encoded into wValue for location 22 and wIndex may be encoded with data 6C65. Activity 526 may comprise a Get_Descriptor request with a write request encoded into wValue for location 23 and wIndex may be encoded with data 7861. Activity 528 may comprise a Get_Descriptor request with a write request encoded into wValue for location 24 and wIndex may be encoded with data 7231. Activity 530 may comprise a Get_Descriptor request with a write request encoded into wValue for location 25 and wIndex may be encoded with data 3233. Activity 532 may comprise a Get_Descriptor request with a write request encoded into wValue for location 26 and wIndex may be encoded with data 3435. The password "lexar12345" may now be encoded into the buffer of the USB device 150, 250, 350. In the same manner the password was stored in the buffer, the password has now been encoded to permit the system to unlock the USB device. As stated above, activity 550 may be to encode a login request into wValue of a Get_Descriptor command, which may unlock a secured memory such as secured memory 172 of FIG. 1.

Figure 6:
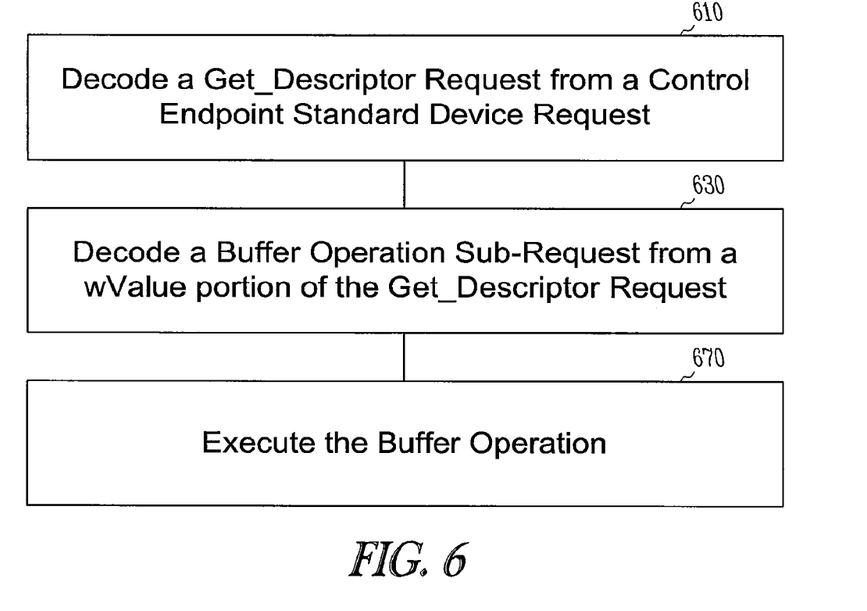
FIG. 6 shows a flow diagram of a method of receiving and executing a buffer operation on a USB device according to an embodiment of the invention.

The functional commands which may be encoded into wValue of a Get_Descriptor request may also include buffer requests (e.g., buffer reset, buffer copy, and fetching the buffer structure). FIG. 6 shows a flow diagram of a method of receiving and executing a buffer operation on a USB device according to an embodiment of the invention.

Activity 610 may comprise decoding a Get_Descriptor request from a control endpoint standard device request. Activity 630 may include decoding a buffer operation sub-request from a wValue portion of the Get_Descriptor request. The buffer operation may include any buffer operation including the buffer operations listed above. Activity 670 may include executing the buffer operation received by the USB device.

Figure 7:
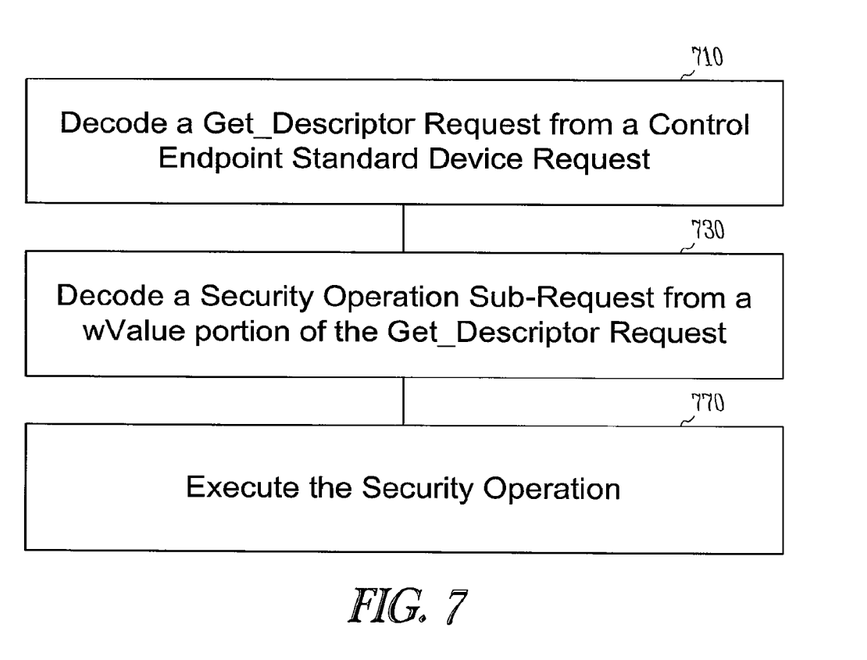
FIG. 7 shows a flow diagram of a method of receiving and executing a security operation for a USB device according to an embodiment of the invention.

The functional commands encoded into wValue may also include security requests such as login, logout, enable security, disable security, change password, reading key data, writing key data and media recovery. FIG. 7 shows a flow diagram of a method of receiving and executing a security operation for a USB device according to an embodiment of the invention.

Activity 710 may comprise decoding a Get_Descriptor request from a control endpoint standard device request. Activity 730 may include decoding a security operation sub-request from a wValue portion of the Get_Descriptor request. The security operation may include any security operation including the security operations listed above. Activity 770 may include executing the security operation received by the USB device.

Referring to FIG. 2, the wValue portion of the Get_Descriptor request may include commands specific to the type of USB device 250 being operated. For example, the USB device 250 may comprise a functional element, such as a keyboard 235, and the functional sub-request may modify a parameter of the functional element. For the keyboard 235, such a request may include converting keys from an English-based keyboard to one of an Asian-based language, for example. Additional functionality for the mouse 240 may be added, for example, by converting the mouse 240 from a right-handed mouse to a left-handed mouse.

Similarly, a functional request for the transceiver/antenna 255 may include increasing or decreasing the gain of the antenna 255. A functional request for the display 260 may include commands to display in landscape or portrait layout based on user preference. Functional requests for the printer 270 may include converting font commands so that Arial fonts print as Times New Roman. Functional requests for the CD/DVD device 275 may include converting region codes on DVDs or CDs. Other functional requests may be used.

Figure 8:
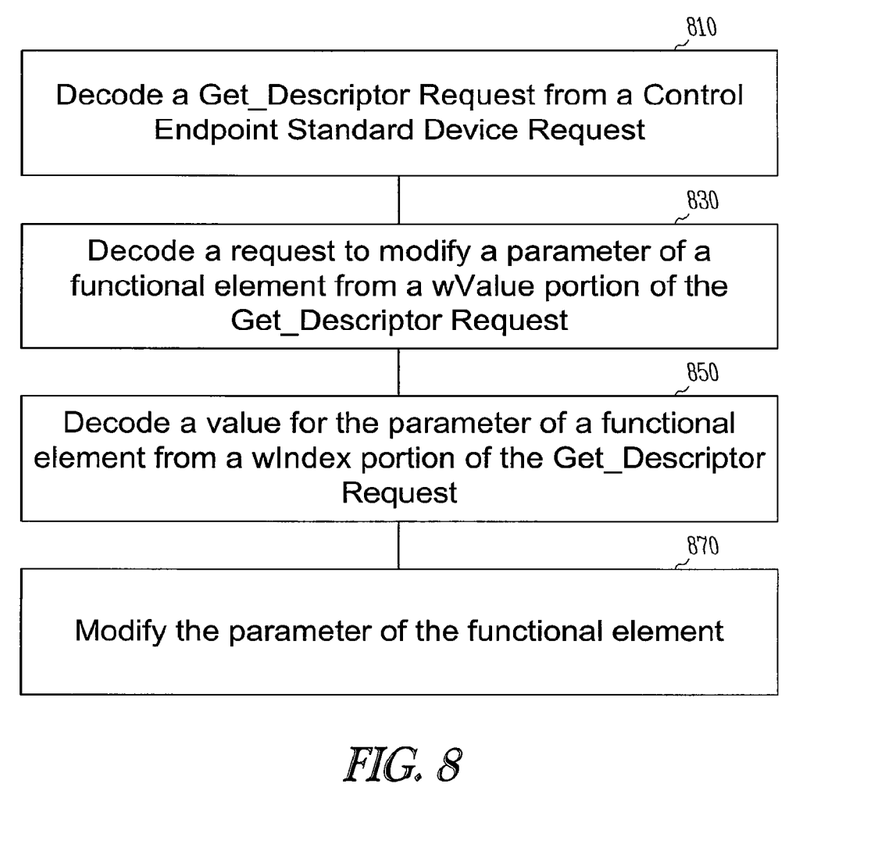
FIG. 8 shows a flow diagram of a method of receiving and modifying a parameter of a USB device according to an embodiment of the invention.

FIG. 8 shows a flow diagram of a method of receiving and modifying a parameter of a USB device according to an embodiment of the invention. Activity 810 may include decoding a Get_Descriptor request from a control endpoint standard device request. Activity 830 may include decoding instructions to modify a parameter of a functional element from a wValue portion of the Get_Descriptor request. Activity 850 may include decoding a value to set the parameter of the functional element from the wIndex portion of a Get_Descriptor request. Activity 870 may comprise modifying the parameter of the functional element according to the value encoded in wIndex.

In addition to functional sub-requests that may operate to modify a parameter of a functional element, functional sub-requests may also be used to request that the functional element perform an action. For the imaging sensor 245, a functional request may include turning the device off at a pre-selected time. The memory device 252 may accept buffer or security commands. For the camera/camcorder 265, the functional commands may include setting a specific record time.

Figure 9:
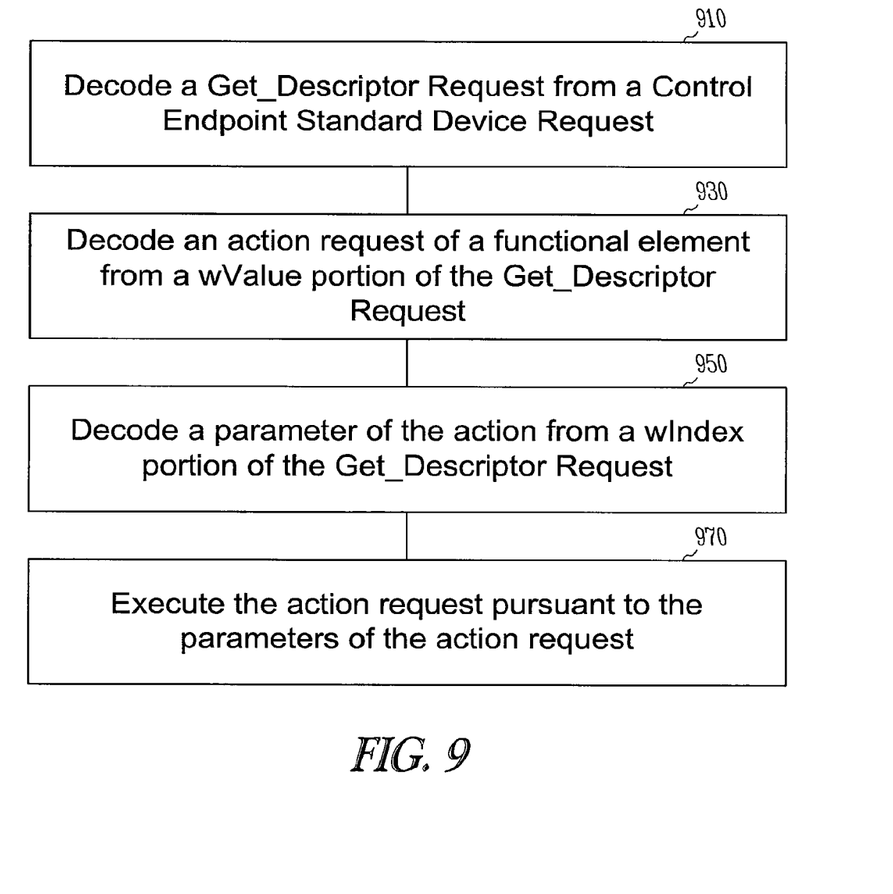
FIG. 9 shows a flow diagram of a method of receiving and executing a functional request at a USB device according to an embodiment of the invention.

FIG. 9 shows a flow diagram of a method of receiving and executing a functional request at a USB device according to an embodiment of the invention. Activity 910 may include decoding a Get_Descriptor request at a control endpoint. Activity 930 may include decoding an action request for a functional element in the wValue portion of the Get_Descriptor request. Activity 950 may include decoding a parameter for an action request in the wIndex portion of a Get_Descriptor request. The parameter may comprise a start time, a stop time, or any of a number of parameters depending upon the specific nature of the action request. Activity 970 may include executing the action request pursuant to the parameter of the action request.

The "Universal Serial Bus Specification" Revision 2.0. does not provide any mechanism for the USB device manipulation disclosed herein. To provide such capability despite lack of recognition in the USB Specification, some embodiments described herein provide for execution of functional requests on a USB device without the need to install additional drivers onto a host, such as a user's personal computer. These functional requests can include device security commands, buffer requests, USB device parameter modifications, and action requests such as ON/OFF action commands.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. A universal serial bus (USB) device comprising:
   an interface to receive a functional request embedded in at least one Get_Descriptor request;
   a functional element; and
   a controller to execute the functional request, wherein the controller is to modify a parameter of the functional element based on the functional request.

2. The USB device of claim 1, wherein the controller is to decode instructions to modify the parameter of the functional element from a wValue portion of the Get_Descriptor request.

3. The USB device of claim 1, wherein the controller is to decode a value to set the parameter of the functional element from a wIndex portion of a Get_Descriptor request.

4. The USB device of claim 1, wherein the controller is to modify the parameter of the functional element according to a value encoded in a wIndex portion of the Get_Descriptor request.

5. The USB device of claim 1, wherein the controller is to turn off the USB device at a selected time based on the functional request.

6. The USB device of claim 1, wherein the controller is to set a specific recording time for the USB device based on the functional request.

7. A universal serial bus (USB) device comprising:
   an interface to receive a functional request embedded in at least one Get_Descriptor request; and
   a controller to execute the functional request, wherein the controller is to write data into memory of the USB device based on the functional request.

8. The USB device of claim 7, further comprising a unit to perform an action including printing.

9. A universal serial bus (USB) device comprising:
   an interface to receive a functional request embedded in at least one Get_Descriptor request; and
   a controller to execute the functional request, wherein the controller is to erase at least a memory portion the USB device based on the functional request.

10. The USB device of claim 9, further comprising a unit to perform an action including taking a picture.

11. A universal serial bus (USB) device comprising:
    an interface to receive a functional request embedded in at least one Get_Descriptor request; and
    a controller to execute the functional request, wherein the controller is to lock the USB device based on the functional request.

12. The USB device of claim 11, further comprising a secure memory.

13. The USB device of claim 12, further comprising an unsecure memory.

14. A universal serial bus (USB) device comprising:
    an interface to receive a functional request embedded in at least one Get_Descriptor request; and
    a controller to execute the functional request, wherein the controller is to unlock the USB device based on the functional request.

15. The USB device of claim 14, further comprising a secure memory.

16. The USB device of claim 15, further comprising an unsecure memory.

17. A universal serial bus (USB) device comprising:
    an interface to receive a functional request embedded in at least one Get_Descriptor request; and
    a controller to execute the functional request, wherein the controller is to write a password into memory of the USB device based on the functional request.

18. The USB device of claim 17, further comprising a unit to perform an action including scanning a document.

19. A universal serial bus (USB) device comprising:
    an interface to receive a functional request embedded in at least one Get_Descriptor request; and
    a controller to execute the functional request without an additional driver being installed onto a host coupled to the USB device.

20. The USB device of claim 19, wherein the controller comprises a logic controller to execute the functional request without an additional driver for the USB device being installed onto a host coupled to the USB device.

* * * * *